No. 645,167. Patented Mar. 13, 1900.
S. ECROYD & E. E. MARSDEN.
APPARATUS FOR UNBALING AND BLENDING RAW COTTON.
(Application filed Sept. 12, 1899.)
(No Model.) 2 Sheets—Sheet 1.
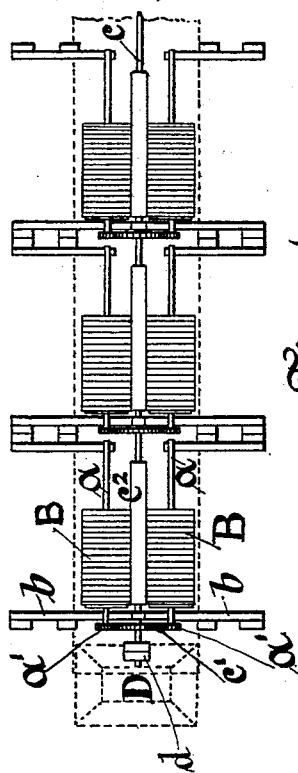
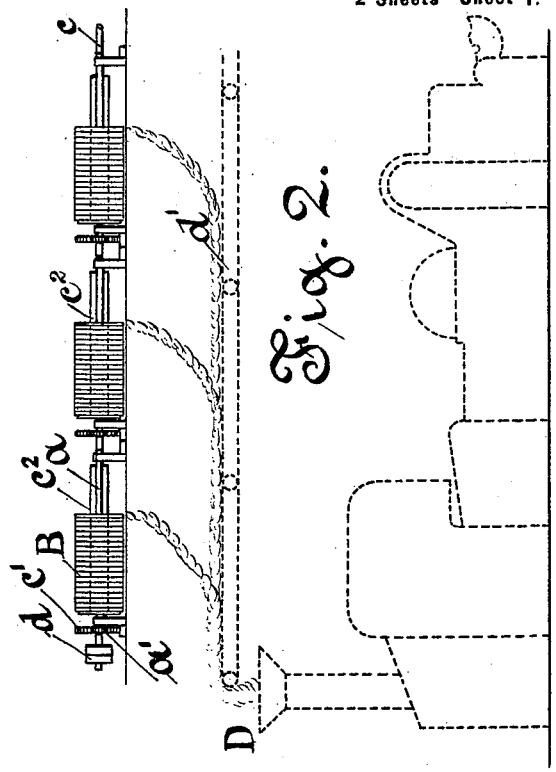
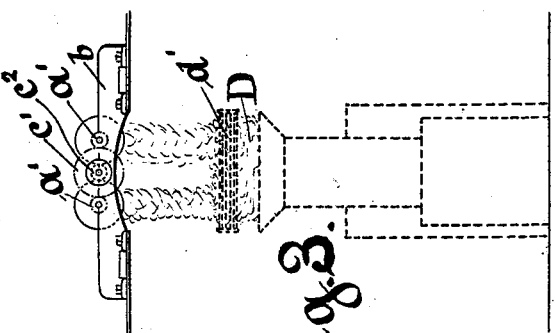

No. 645,167. Patented Mar. 13, 1900.
S. ECROYD & E. E. MARSDEN.
APPARATUS FOR UNBALING AND BLENDING RAW COTTON.
(Application filed Sept. 12, 1899.)
(No Model.) 2 Sheets—Sheet 2.
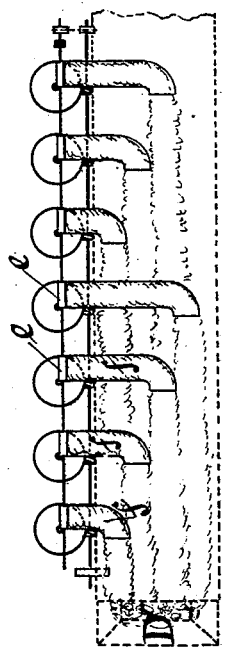
Fig. 4.
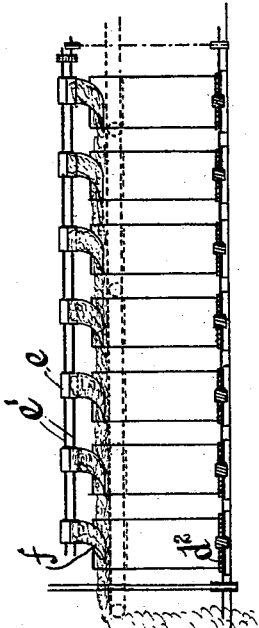
Fig. 5.
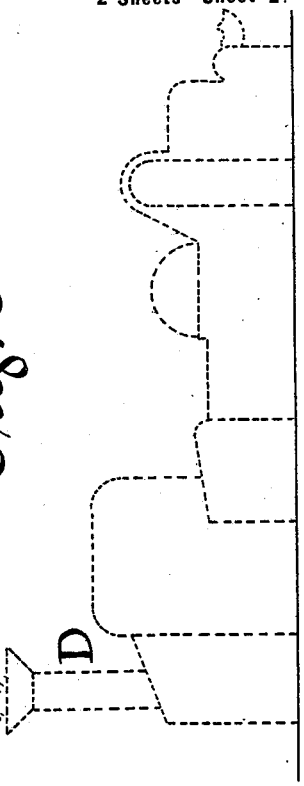
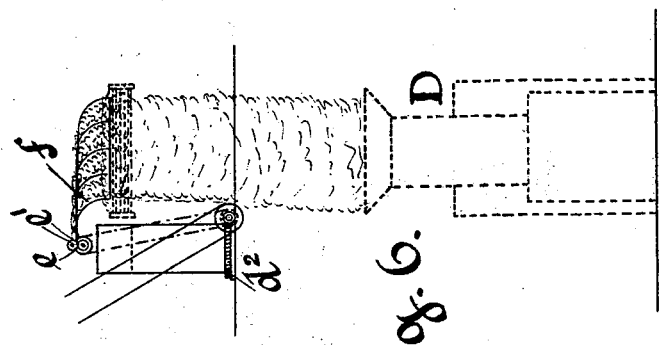
Fig. 6.

UNITED STATES PATENT OFFICE.

SAMUEL ECROYD, OF CHORLTON-CUM-HARDY, AND EDWARD E. MARSDEN, OF DIDSBURY, ENGLAND.

APPARATUS FOR UNBALING AND BLENDING RAW COTTON.

SPECIFICATION forming part of Letters Patent No. 645,167, dated March 13, 1900.

Application filed September 12, 1899. Serial No. 730,270. (No model.)

*To all whom it may concern:*

Be it known that we, SAMUEL ECROYD, a resident of 100 Oswald road, Chorlton-cum-Hardy, and EDWARD ELLIS MARSDEN, a resident of 38 Bamford road, Didsbury, county of Lancaster, England, subjects of the Queen of Great Britain and Ireland, have invented certain new and useful Improvements in Apparatus for Unbaling and Blending Raw Cotton, (for which we have filed application for British patent, No. 12,665, dated June 17, 1899;) and we do hereby declare the following to be a full, clear, and exact description of the invention, such as will enable others skilled in the art to which it appertains to make and use the same.

This invention relates to the unbaling and blending of cotton, and is particularly applicable to the treatment of bales in which the cotton is pressed in coiled layers, such as the type of bale commonly known as the "Lowry" bale, in which the cotton lies in one or more, more or less, coherent coils disposed transversely to the axis of the bale.

The underlying feature of this invention consists in uncoiling the cotton in a reverse direction to that in which it was laid. This we accomplish by the rotation of the bale, and at the same time we deposit the cotton taken from two or more bales onto a traveling sheet or other conveyer, which carries the cotton to a cotton-opener or other machine for subsequent treatment preparatory to spinning. By this process the twist possessed by the cotton if taken straight from such a bale is eliminated, and facilities are given for automatically blending the cotton direct from the bales, and thus obtaining a more uniform mixture.

In the accompanying drawings, which illustrate this invention, Figure 1 is a plan, Fig. 2 is a side elevation, and Fig. 3 is an end elevation, of means for rotating the bales on spindles and blending their contents. Fig. 4 is a plan, Fig. 5 is a side elevation, and Fig. 6 is an end elevation, of means for rotating the bales on plates instead of on spindles.

In the method illustrated in Figs. 1, 2, and 3 a spindle $a$ is driven longitudinally through each bale B. The whole is then laid in bearings in the bed $b$ of the machine. Running longitudinally along the machine is a driving-shaft $c$, driven by the pulleys $d$ or other suitable means. The central shaft $c$ carries spur-wheels $c'$, which engage with pinions $a'$, fixed on the spindles $a$. On the central shaft $c$ are also mounted rollers $c^2$, which by their friction against the outer surface of the bales aid their rotation. The shaft $c$ is turned so as to rotate the bales in a direction opposite to that in which the cotton is coiled up in the formation of the bale. The cover of the bale having been removed and some of the cotton drawn away, the cotton will on the rotation of the bale fall away by gravity, and thus the whole contents of each bale will gradually uncoil and fall onto the traveling sheet $d'$ or other conveyer, which collects the cotton from a number of bales and delivers it to the feed-hopper of a beater, opener, or other machine, such as shown in dotted lines at D.

In cases where the formation of the bale does not conveniently lend itself to the use of a spindle the arrangement shown in Figs. 4, 5, and 6 is employed. The bales are placed on plates arranged to be rotated by a worm-shaft and worm-wheels $d^2$ or by other suitable means. Over each bale is a pair of drawing-off rollers $e$, mounted on rotating longitudinal shafts $e'$ and held together by weights, springs, or the like means.

The bales having been stripped of their coverings are deposited on the plates. The top end of the cotton of each bale is lifted up and passes through its drawing-off rollers, and the plates are then turned in a direction opposite to that in which the cotton was originally coiled. The cotton from all the bales is conducted over guides $f$ onto a traveling lattice, creeper, or conveyer $d'$, as already described, and conveyed collectively to the feed-hopper of the machine D for subsequent treatment.

Other methods may be used for rotating the bale, and the details of the conveyer may be varied almost indefinitely to suit the exigencies of any particular case. For example, the cotton from the rotating bales may be deposited in a conveyer adapted to carry the cotton upward to a higher part of the mill, whence it may descend through the various machines used in treating the cotton previous to spinning.

What we claim as our invention, and desire to secure by Letters Patent, is—

1. In a machine for removing cotton endwise from coiled bales, the combination of supporting devices for a plurality of bales with gearing acting on the said supporting devices for rotating the latter in the direction opposite to that of winding and a traveling conveyer arranged to receive the cotton from the ends of the rolls and transport the same in a mixed condition for further treatment, sufficient open space being left at the delivery end of each coiled bale to permit the convenient drawing off of the cotton without obstruction by the frame or other part of the machine the bales being all adapted to feed onto the same apron substantially as set forth.

2. In combination with plates adapted to support bales of coiled cotton in an upright position, mechanism for rotating the said plates, drawing-off rollers arranged in pairs for drawing the sheet from each bale, means for rotating the said rollers in opposite directions and a traveling conveyer adapted to receive the sheets from all of the rollers and transport the same in a mixed condition for further treatment, substantially as and for the purpose set forth.

In testimony whereof we hereunto affix our signatures in presence of two witnesses.

SAMUEL ECROYD.
EDWARD E. MARSDEN.

Witnesses:
JOHN HALL,
A. T. WHITELOW.